United States Patent [19]

Bailey et al.

[11] 4,130,013
[45] Dec. 19, 1978

[54] APPARATUS AND METHOD FOR USING FUEL PRESSURE TO TRIGGER AN INJECTION TIMING DEVICE

[75] Inventors: John M. Bailey, Dunlap; Ronald K. Scott, Buda, both of Ill.

[73] Assignee: Caterpillar Tractor Co., Peoria, Ill.

[21] Appl. No.: 864,997

[22] Filed: Dec. 27, 1977

[51] Int. Cl.² ........................................... G01M 15/00
[52] U.S. Cl. ................................................. 73/119 A
[58] Field of Search ...................... 73/753, 119 A, 118

[56] References Cited
U.S. PATENT DOCUMENTS 3,698,249  10/1972  Weaver .......................... 73/119 A X
3,898,885  8/1975   Russell .......................... 73/119 A X Primary Examiner—Jerry W. Myracle
Attorney, Agent, or Firm—Phillips, Moore, Weissenberger, Lempio & Majestic

[57] ABSTRACT

A strain gauge transducer device externally mounted on a fuel line leading to a diesel engine and a circuit for developing engine timing signals from the transducer device output. The circuit includes a peak voltage detector to detect a peak signal from the transducer device output and a scaling potentiometer which attenuates the peak signal by a preset percentage to a level corresponding to the desired fuel pressure. A comparator compares the attenuated signal to the transducer device output and produces a timing signal when the latter is equal to or exceeds the former.

12 Claims, 11 Drawing Figures

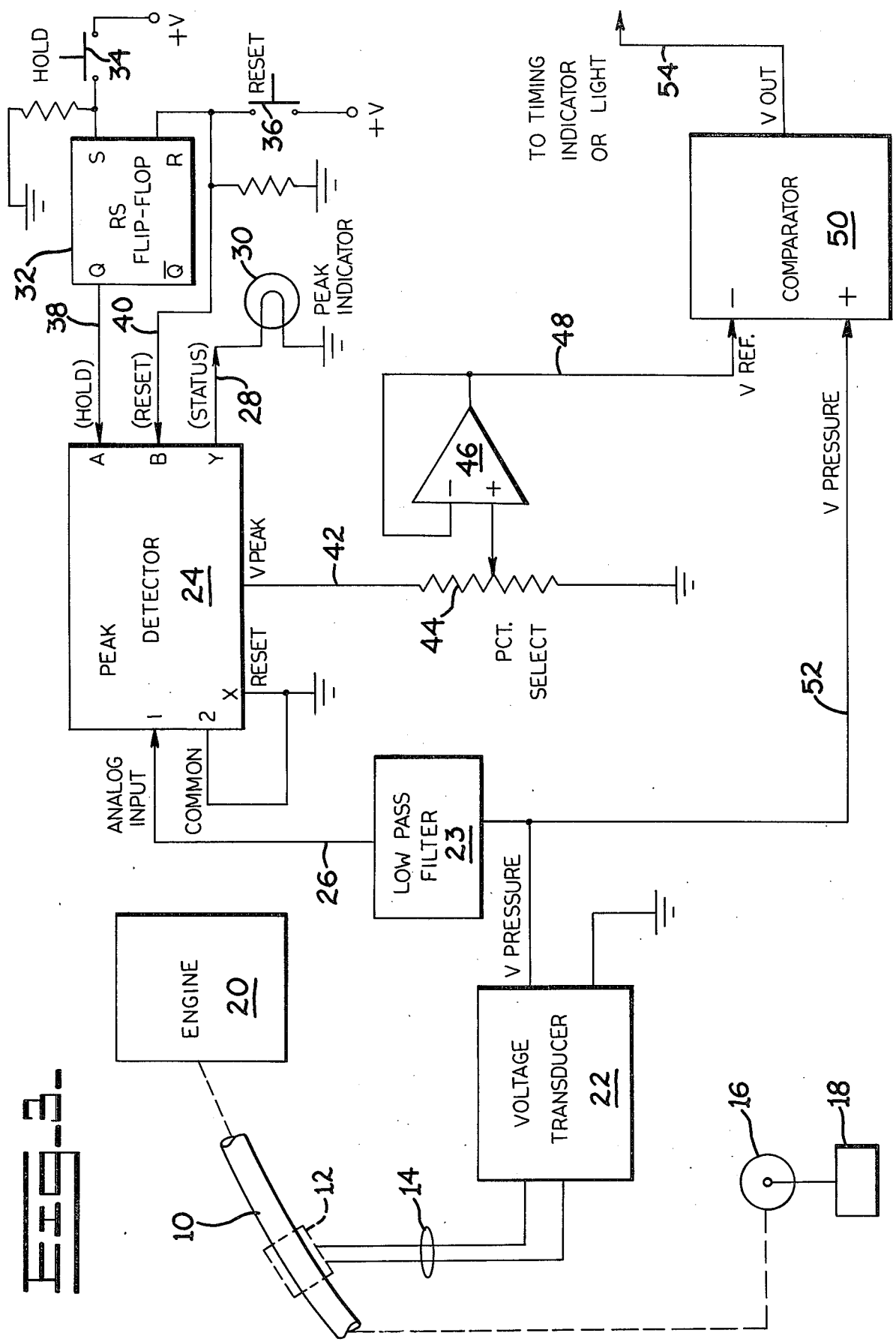

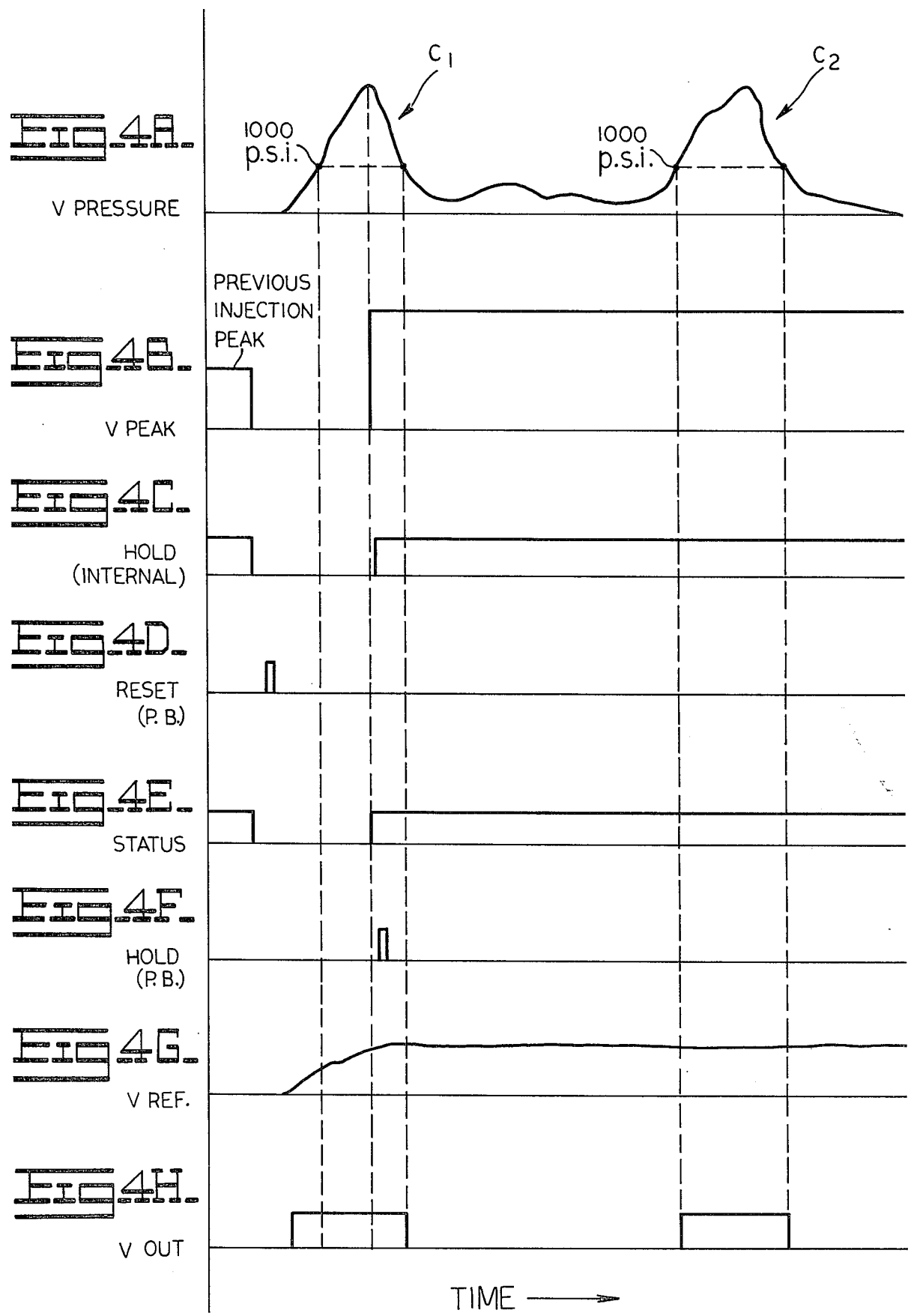

APPARATUS AND METHOD FOR USING FUEL PRESSURE TO TRIGGER AN INJECTION TIMING DEVICE

BACKGROUND OF THE INVENTION

The invention relates to a method and apparatus for providing a timing signal to indicate the timing of an engine and, more particularly, to a method and apparatus for producing an engine timing signal for diesel engines having a fuel injection system.

In order to assure optimum operation of an internal combustion engine, service procedures are periodically practiced whereby, for example, the engine timing is set to an appropriate value. Engine timing for a spark ignition internal combustion engine is relatively simply adjusted since an electrical signal providing timing information is easily obtainable from the distributor. However, in diesel engines there is no such electrical signal available because of the absence of spark plugs and a distributor; consequently, other techniques are employed for timing purposes.

With a diesel engine having a fuel injection system, injection occurs when the fuel pressure is at a predetermined value such as 1000 psi. Typically, fuel pressure in the fuel line leading to one of the diesel engine cylinders is sensed by a pressure transducer for developing a timing signal when the fuel pressure reaches the predetermined value. At this moment of fuel pressure, the fuel injector is activated to inject fuel into the corresponding cylinder.

One diesel engine timing technique requires breaking into and modifying the fuel line to accommodate a transducer which must be in direct communication with the fuel to tune the engine. This is not desirable since it takes a relatively long period of time to open the fuel line connection, insert the transducer to adjust the timing, close the connection, and then remove the transducer from the fuel line after tuning the engine. Furthermore, since diesel engine fuel lines are under high pressure, the connections must be carefully opened and closed.

In another technique, the above disadvantages have been substantially eliminated by employing a transducer which has a detector mounted on the outside of the fuel line such that expansion and contraction of the line causes variations in the transducer output. This pressure transducer can be of the strain gauge type having at least one resistance element mounted directly on the fuel line circumference. Piezoelectric devices or other clamp-on types of pressure transducers can also be used. A disadvantage with such externally located transducers is that it has not yet been possible to calibrate the transducer for proper correction factors to account for inaccuracies in its output. The measured output signal is inaccurate because variation in fuel line wall thickness and other factors will affect transducer sensitivity. It is therefore desirable to utilize such an externally mounted type of pressure transducer, but without engine timing errors produced by transducer inaccuracies.

SUMMARY OF THE INVENTION

The present invention is directed to overcoming one or more of the problems as set forth above.

According to the present invention, there is a method of providing fuel injection timing information to set the timing of an engine including running the engine under a certain condition, sensing the pressure of fuel in a fuel line with a pressure sensing means, generating a first variable amplitude output signal with the pressure sensing means, the first signal having fuel pressure information, generating a second signal proportional to a peak amplitude of the first variable signal, comparing the second signal with the first variable signal, and generating a third signal when the first signal is at least equal to the second signal to produce the timing information.

Also according to the present invention, there is an apparatus for triggering a timing indicator to adjust the engine timing of a vehicle having a fuel injection system including a fuel line leading to the engine, comprising means for sensing fuel pressure in the fuel line and generating a first variable amplitude signal having fuel pressure information, means, responsive to the first signal, for generating a second signal corresponding to the peak amplitude of the first signal, means, responsive to the second signal, for generating a third signal proportional to the second signal and having information relating to a predetermined fuel pressure in the line, and means, responsive to the first signal and the third signal, for generating a triggering signal when the first signal at least equals the third signal.

BRIEF DESCRIPTION OF THE DRAWINGS

FIG. 3 is a schematic circuit diagram of the present invention.

FIGS. 4A-4H illustrate a timing diagram of the various signals in the circuit of FIG. 3.

DETAILED DESCRIPTION OF THE DRAWINGS

Figure 1:
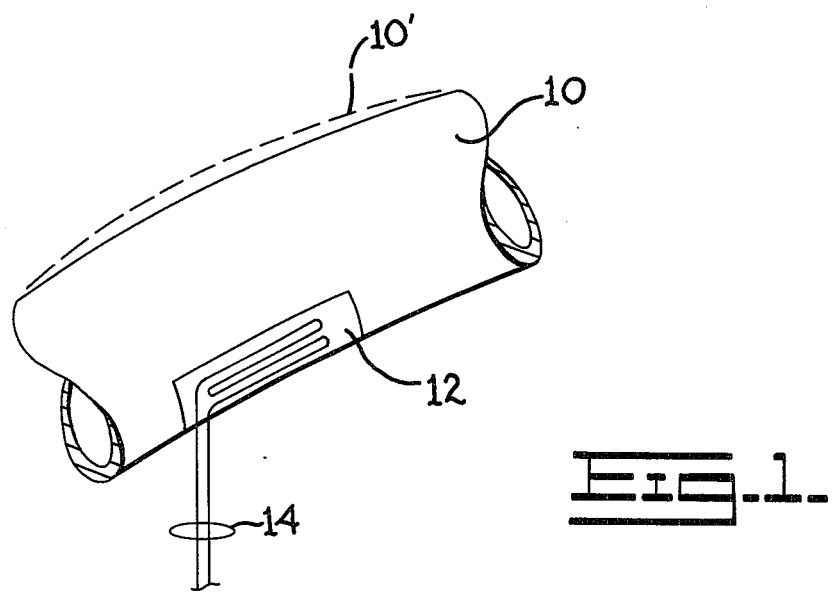
FIG. 1 shows a segment of a fuel line having fixed thereto a transducer.

FIG. 1 shows a segment of a high pressure fuel line 10 for supplying pressurized fuel to a diesel engine. A transducer 12, such as a strain gauge transducer, is attached to the fuel line 10 to provide an electrical signal substantially proportional to the pressure in the line. An example of a suitable transducer 12 for use with the present invention is disclosed in U.S. Pat. No. 3,937,087, issued Feb. 10, 1976 to William Heggie.

The fuel line 10 is a common tubular hollow conduit of metal such as steel for transmitting high pulsating fluid pressures. As these pressure pulses occur, the line 10 will deflect a small amount to a larger diameter shown in phantom in FIG. 2 by reference 10'. This deflection is sensed by the transducer 12 as an indication of the pressure within line 10.

Figure 2:
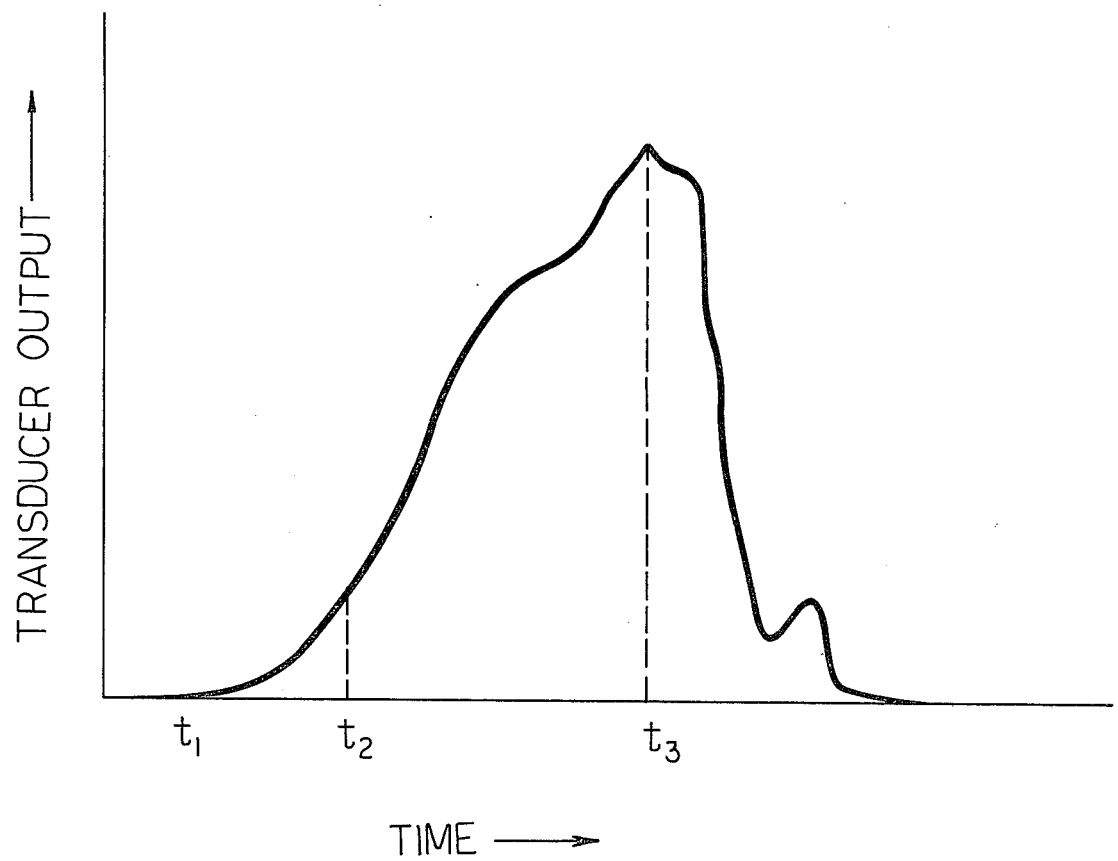
FIG. 2 shows a graphical illustration of a transducer output signal as a function of time for a representative diesel engine.

Transducer 12 produces an output signal on line 14, this signal being shown in FIG. 2 as a function of time after being transduced by a voltage transducer described in connection with FIG. 3. Unfortunately, the transducer output signal shown in FIG. 2 is not a predictable function of the fuel pressure within line 10 because of variations in fuel line wall thickness and other factors. Consequently, the peak signal shown at time $t_3$ can be any value, in view of these variables.

The present invention is based on the realization that no matter what the peak value is at time $t_3$, it can be used, for specific engine conditions, as a measure of a desirable pressure for injection start, which pressure may be 1000 psi. These engine conditions include, for example, low idle or high idle, during which injection timing is normally checked. While the peak signal at time $t_3$ will vary under these engine conditions for different engine-fuel pump combinations, in most cases the fuel line pressure of 1000 psi would occur when the signal shown in FIG. 2 is about 20–30% of the peak signal. Consequently, when the signal shown in FIG. 2 is within this range of 20–30%, which occurs at about time $t_2$, it can be assumed that at this time the pressure in fuel line 10 is about 1000 psi which translates into an engine timing accuracy with the present invention of about ±1°.

As shown in FIG. 3, a fuel pump 16 pumps fuel from a fuel tank 18, through the fuel line 10, to the fuel injector (not shown) of an engine 20, such as a diesel engine. The transducer 12 mounted on line 10 is coupled via lines 14 to a voltage transducer 22 whose output is the signal shown in FIGS. 2 and 4A. A low pass filter network 23 receives the output of transducer 22 and substantially eliminates any high frequency noise from this pressure signal. A peak detector 24 receives the output of low-pass filter 23 on a line 26 to detect the peak amplitude of this voltage signal. The detector 24 tracks the signal on line 26 until it reaches a maximum value and then automatically holds this value while signalling that a peak has been reached by providing a status signal shown in FIG. 4E on line 28 to energize a peak indicator 30, such as a lamp.

When a peak is indicated, the detector 24 can then be placed in a "hold" mode to ignore further peaks, or be reset to a reference level ready to detect the next peak. An RS flip-flop 32 is used to place the detector in either the hold or reset mode. Flip-flop 32 has its set input S coupled to a power supply +V when a hold button 34 is depressed. The reset input R of flip-flop 32 is coupled to +V through a reset button 36 when this button is depressed. The Q output of flip-flop 32 is fed to detector 24 over line 38 as the hold signal shown in FIG. 4F to place the detector in the hold mode. The $\bar{Q}$ output of flip-flop 32 is left open, i.e., not connected in circuit. Detector 24 is coupled to the reset button 36 via line 40 which provides the reset signal shown in FIG. 4D. A suitable peak detector 24 is Model No. 4084/25, manufactured by the Burr-Brown Company, Tucson, Arizona.

The peak signal detected by detector 24 and shown in FIG. 4B is output over line 42 to a scaling potentiometer 44 that can be calibrated in percent. Potentiometer 44 functions to attenuate the signal on line 42 to a value that is a desired percentage of the peak signal, based on the operating condition of the engine. For example, for a low idle operating condition, the potentiometer 44 may be scaled to attenuate the signal on line 42 to 20% of its value. The attenuated signal is then coupled to amplifier 46 which then provides a reference voltage signal shown in FIG. 4G over line 48 as a suitable input for a comparator 50. The other input to comparator 50 is the pressure signal from transducer 22 on line 52, which is the signal shown in FIGS. 2 and 4A.

Comparator 50 produces an output voltage signal shown in FIG. 4H on line 54 whenever the signal on line 52 is equal to or exceeds the signal on line 48. This output voltage signal on line 54 is a timing signal which can be fed to a timing indicator or light. For example, this signal on line 54 can be input to an oscilloscope along with a signal from a magnetic pickup associated with the engine flywheel (not shown). The two signals displayed on the oscilloscope can be visually compared and the injection system adjusted to provide the desired timing; that is to inject fuel when the fuel pressure in line 10 is 1000 psi. A suitable comparator 50 is Model No. 4082, manufactured by the Burr-Brown Company.

In operation, the engine 20 is started and allowed to run at a selected speed to check timing, such as low idle. When this engine operating condition is reached, the reset button 36 is depressed to reset flip-flop 32 and provide the reset signal to detector 24. Consequently, any peak voltage information held in detector 24 from a previous injection cycle, as shown in FIG. 4B, is cleared. The next injection cycle shown as cycle $C_1$ in FIG. 4A serves as the basis for setting potentiometer 44. When the status signal shown in FIG. 4E is first generated during this cycle $C_1$, the peak signal of FIG. 4B is locked or held in detector 24 by depressing button 34 which changes the state of flip-flop 32 to provide the hold signal shown in FIG. 4F. The detector 24 then will ignore all succeeding peaks and the potentiometer 44 can then be adjusted to provide the reference signal shown in FIG. 4G, which is the desired percent of the peak signal. Then, during the next injection cycle $C_2$ and each succeeding cycle thereafter, each time the signal shown in FIG. 4A equals or exceeds the reference signal of FIG. 4G, comparator 50 will provide the timing pulse of FIG. 4H. The leading edge of this pulse from comparator 50 may constitute a timing mark and is based on a specific level of fuel injection pressure, i.e., 1000 psi in the example given. Thus, when the signal shown in cycle $C_2$ reaches the percentage of the peak signal determined by adjusting potentiometer 44, it is an indication that the fuel pressure in line 10 is 1000 psi, at which time injection should be started.

It therefore will be appreciated that with this invention, an externally mounted transducer 12 can be utilized without calibrating it, while being able to time the engine with high accuracy.

While the invention has been particularly shown and descrobed with reference to preferred embodiments thereof, it will be understood by those skilled in the art that the foregoing and other changes in form and details may be made therein without departing from the spirit and scope of the invention.

The embodiments of the invention in which an exclusive property or privilege is claimed are defined as follows:

1. A method of providing fuel injection timing information to set the timing of an engine, comprising:
    (a) running the engine under a certain condition;
    (b) sensing the pressure of fuel in a fuel line with a pressure sensing means;
    (c) generating a first variable amplitude output signal with said pressure sensing means, said first signal having fuel pressure information;
    (d) generating a second signal proportional to a peak amplitude of said first variable signal;
    (e) comparing said second signal with said first variable signal; and
    (f) generating a third signal when said first signal is at least equal to said second signal to produce the timing information.

2. A method according to claim 1 wherein the step of generating said second signal comprises:
    (a) detecting the peak amplitude of said first signal;
    (b) producing a peak amplitude signal; and
    (c) attenuating said peak amplitude signal by a predetermined percent of the peak amplitude.

3. A method according to claim 2 wherein said peak amplitude signal is attenuated to a level corresponding to a desired fuel pressure in the fuel line.

4. A method according to claim 3 wherein the step of attenuating comprises:
 (a) feeding said peak amplitude signal to a potentiometer; and
 (b) presetting said potentiometer so as to produce said attenuated peak amplitude signal.

5. A method according to claim 4 wherein the step of peak detecting comprises:
 (a) generating a status signal indicating detection of the peak amplitude of said first signal; and
 (b) storing the peak amplitude so as to ignore any succeeding peak amplitudes.

6. Apparatus for triggering a timing indicator to adjust the engine timing of a vehicle having a fuel injection system, including a fuel line leading to the engine, said apparatus comprising:
 (a) means for sensing fuel pressure in said fuel line and generating a first variable amplitude signal having fuel pressure information;
 (b) means, responsive to said first signal, for generating a second signal corresponding to the peak amplitude of said first signal;
 (c) means, responsive to said second signal, for generating a third signal proportional to said second signal and having information relating to a predetermined fuel pressure in said line; and
 (d) means, responsive to said first signal and said third signal, for generating a triggering signal when said first signal at least equals said third signal.

7. Apparatus according to claim 6 wherein said sensing and first signal generating means comprises a pressure transducer which is sensitive to factors other than fuel pressure.

8. Apparatus according to claim 7 wherein said third signal generating means comprises means for attenuating said second signal by a predetermined percentage of said second signal.

9. Apparatus according to claim 8 wherein said pressure transducer is mountable about the circumference of said fuel line.

10. Apparatus according to claim 9 wherein said means for attenuating comprises:
 (a) a potentiometer for attenuating said second signal; and
 (b) an amplifier for receiving said attenuated second signal.

11. Apparatus according to claim 10 wherein said second signal generating means comprises:
 (a) a signal detector for detecting the peak amplitude of said first signal; and
 (b) means for holding the peak amplitude of said first signal so as to ignore succeeding peak amplitudes.

12. Apparatus according to claim 11 wherein said triggering signal generating means comprises a comparator.

* * * * *